United States Patent
Ishikawa

(10) Patent No.: US 8,706,939 B2
(45) Date of Patent: Apr. 22, 2014

(54) DEVICE FOR ARBITRATING BUS ACCESSES AND METHOD FOR CONTROLLING SAME

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/304,115

(22) Filed: Nov. 23, 2011

(65) Prior Publication Data

US 2012/0110230 A1     May 3, 2012

Related U.S. Application Data

(63) Continuation of application No. 11/378,005, filed on Mar. 17, 2006, now Pat. No. 8,086,776.

(30) Foreign Application Priority Data

Mar. 30, 2005 (JP) ................................. 2005-099420

(51) Int. Cl.
- *G06F 3/00* (2006.01)
- *G06F 5/00* (2006.01)
- *G06F 12/00* (2006.01)
- *G06F 13/14* (2006.01)
- *G06F 13/38* (2006.01)

(52) U.S. Cl.
USPC ................. 710/241; 710/53; 710/56; 710/57; 710/244

(58) Field of Classification Search
USPC ................... 710/53, 56, 57, 240–244
See application file for complete search history.

(56) References Cited

U.S. PATENT DOCUMENTS

| | | | | | |
|---|---|---|---|---|---|
| 4,682,284 | A | * | 7/1987 | Schrofer | 710/55 |
| 4,751,671 | A | * | 6/1988 | Babetski et al. | 710/56 |
| 4,761,807 | A | * | 8/1988 | Matthews et al. | 379/88.26 |
| 4,805,128 | A | * | 2/1989 | Nelsen et al. | 708/204 |
| 4,829,475 | A | * | 5/1989 | Ward et al. | 365/78 |
| 4,924,380 | A | * | 5/1990 | McKinney et al. | 710/111 |
| 5,068,782 | A | * | 11/1991 | Scheuneman et al. | 711/151 |
| 5,155,810 | A | * | 10/1992 | McNamara et al. | 710/52 |
| 5,179,662 | A | * | 1/1993 | Corrigan et al. | 711/2 |

(Continued)

FOREIGN PATENT DOCUMENTS

| | | | | | |
|---|---|---|---|---|---|
| JP | 1320555 | A | * | 12/1989 | G06F 12/08 |
| JP | 04114389 | A | * | 4/1992 | G11C 7/00 |

(Continued)

OTHER PUBLICATIONS

Jun Pang; Lei Yang; Lei Shi; Tiejun Zhang; Donghui Wang; Chaohuan Hou, "A priority-expression-based burst scheduling of memory reordering access," Embedded Computer Systems: Architectures, Modeling, and Simulation, 2008. SAMOS 2008. International Conference on , pp. 203,209, Jul. 21-24, 2008.*

(Continued)

*Primary Examiner* — Faisal M Zaman

(74) *Attorney, Agent, or Firm* — Canon U.S.A., Inc. IP Division

(57) ABSTRACT

In an information-processing apparatus including a plurality of modules and a first arbiter which arbitrates bus-access requests of the plurality of modules, at least one of the plurality of modules includes a plurality of submodules and a second arbiter which arbitrates bus-access requests of the plurality of submodules and transmits at least one of the bus-access requests of the plurality of submodules to the first arbiter.

10 Claims, 8 Drawing Sheets

(56) References Cited

U.S. PATENT DOCUMENTS

| | | | |
|---|---|---|---|
| 5,210,829 A * | 5/1993 | Bitner | 710/57 |
| 5,440,691 A * | 8/1995 | Carrafiello et al. | 709/234 |
| 5,537,128 A * | 7/1996 | Keene et al. | 345/89 |
| 5,548,796 A * | 8/1996 | Ketchum | 710/52 |
| 5,758,075 A * | 5/1998 | Graziano et al. | 709/250 |
| 5,781,927 A * | 7/1998 | Wu et al. | 345/535 |
| 5,933,413 A * | 8/1999 | Merchant et al. | 370/234 |
| 5,950,229 A * | 9/1999 | Jeddeloh | 711/150 |
| 5,987,621 A * | 11/1999 | Duso et al. | 714/4.11 |
| 6,044,431 A * | 3/2000 | Greenwood et al. | 711/5 |
| 6,049,841 A * | 4/2000 | Fields, Jr. et al. | 710/28 |
| 6,094,696 A * | 7/2000 | Choe et al. | 710/57 |
| 6,141,715 A * | 10/2000 | Porterfield | 710/113 |
| 6,154,826 A * | 11/2000 | Wulf et al. | 711/217 |
| 6,189,061 B1 * | 2/2001 | Katz et al. | 710/110 |
| 6,208,703 B1 * | 3/2001 | Cavanna et al. | 375/372 |
| 6,629,220 B1 * | 9/2003 | Dyer | 711/158 |
| 6,662,306 B2 * | 12/2003 | Van Loo | 713/600 |
| 6,715,011 B1 * | 3/2004 | Buckland et al. | 710/100 |
| 6,804,736 B2 * | 10/2004 | Olarig | 710/240 |
| 6,810,470 B1 * | 10/2004 | Wiseman et al. | 711/163 |
| 6,836,812 B2 * | 12/2004 | Lin | 710/305 |
| 6,839,784 B1 * | 1/2005 | Ennis et al. | 710/240 |
| 6,907,479 B2 * | 6/2005 | Karnstedt et al. | 710/52 |
| 7,080,177 B2 * | 7/2006 | Neuman | 710/240 |
| 7,107,374 B1 * | 9/2006 | Stadler | 710/107 |
| 7,110,359 B1 * | 9/2006 | Acharya | 370/235 |
| 7,216,182 B2 * | 5/2007 | Henkel | 710/5 |
| 7,606,269 B1 * | 10/2009 | Suh et al. | 370/503 |
| 7,873,761 B2 * | 1/2011 | Castanha et al. | 710/52 |
| 8,086,776 B2 * | 12/2011 | Ishikawa | 710/241 |
| 2001/0023469 A1 * | 9/2001 | Jeong et al. | 710/241 |
| 2002/0176430 A1 * | 11/2002 | Sangha et al. | 370/412 |
| 2003/0018862 A1 * | 1/2003 | Karnstedt et al. | 711/156 |
| 2003/0033461 A1 * | 2/2003 | Malik et al. | 710/107 |
| 2003/0221032 A1 * | 11/2003 | Gwilt et al. | 710/110 |
| 2004/0202073 A1 * | 10/2004 | Lai et al. | 369/47.33 |
| 2004/0222997 A1 * | 11/2004 | Crook et al. | 345/557 |
| 2005/0193166 A1 * | 9/2005 | Johnson et al. | 711/114 |
| 2005/0246481 A1 * | 11/2005 | Rohit et al. | 711/105 |
| 2006/0123187 A1 * | 6/2006 | Bellows et al. | 711/104 |
| 2006/0143345 A1 * | 6/2006 | Fredriksson | 710/106 |
| 2010/0138839 A1 * | 6/2010 | Bekooij et al. | 718/102 |
| 2012/0110230 A1 * | 5/2012 | Ishikawa | 710/241 |

FOREIGN PATENT DOCUMENTS

| | | | | |
|---|---|---|---|---|
| JP | 07319630 A | * | 12/1995 | G06F 3/06 |
| JP | 10011337 A | * | 1/1998 | G06F 12/00 |
| JP | 2005210606 A | * | 8/2005 | H04L 12/56 |
| JP | 2006295819 A | * | 10/2006 | H04L 12/56 |
| JP | 2006309757 A | * | 11/2006 | G06F 12/00 |

OTHER PUBLICATIONS

Picker, D.; Fellman, R., "A VLSI priority packet queue with inheritance and overwrite," Very Large Scale Integration (VLSI) Systems, IEEE Transactions on , vol. 3, No. 2, pp. 245,253, Jun. 1995.*

Picker, D.; Fellman, R., "Scaling and performance of a priority packet queue for real-time applications," Real-Time Systems Symposium, 1994., Proceedings. , pp. 56,62, Dec. 7-9, 1994.*

Van de Goor, A. J.; Zorian, Y., "Functional tests for arbitration SRAM-type FIFOs," Test Symposium, 1992. (ATS '92), Proceedings., First Asian (Cat. No. TH0458-0) , pp. 96,101, Nov. 26-27, 1992.*

* cited by examiner

DEVICE FOR ARBITRATING BUS ACCESSES AND METHOD FOR CONTROLLING SAME

CROSS-REFERENCE TO RELATED APPLICATIONS

This application is a continuation application of U.S. Ser. No. 11/378,005 filed Mar. 17, 2006, which claims priority to Japanese Application Serial No. 2005-099420, filed Mar. 30, 2005, all of which the contents of are hereby incorporated by reference in their entirety.

BACKGROUND OF THE INVENTION

1. Field of the Invention

The present invention relates to a device configured to arbitrate bus accesses made by a plurality of modules and a method for controlling the device.

2. Description of the Related Art

When a bus-use request is transmitted from each of a plurality of bus masters which access a memory bus connected to a dynamic random access memory (DRAM), an arbiter configured to arbitrate the bus accesses gives the right to use the memory bus to one of the bus masters, so as to control (arbitrate) the bus-use right. In the past, the bus-use-right priority has been given to the bus masters from a hardware point of view. Therefore, when the bus-use requests are transmitted from the plurality of bus masters at the same time, the bus arbiter transmits a bus-use-permission signal to a predetermined one of the bus masters, which is typically the bus master with a high priority. Subsequently, the bus-use right is given to the bus master with the high priority. The above-described technology is disclosed in Japanese Patent Laid-Open No. 09-062579, for example.

Accordingly, if the bus-use request is frequently transmitted from the bus master with the high priority, the rate at which the bus master with the high priority obtains the bus-use right increases. In that case, it becomes difficult for the bus master with a low priority to obtain the bus-use right.

Therefore, by restricting the reception of the next bus-use request until the bus-use right is given to each of the bus-use requests that were received, the bus master with the low priority can obtain the bus-use right. However, when a large number of the bus masters transmit the bus-use requests, the number of accesses made by the bus master with the high priority becomes almost the same as that of accesses made by the bus master with the low priority.

Further, if the bus-use right is moved from one bus master to another bus master at frequent intervals when a burst-transfer-capable bus and/or the memory bus connected to the DRAM or the like is used, overhead for the address setting increases and the bus-use efficiency decreases.

Further, when the arbitration of the bus-use right is exclusively performed by a single arbiter, the arbitration processing becomes complicated due to an increased number of bus masters, the circuit size increases, and the high-speed operability of the bus decreases.

SUMMARY OF THE INVENTION

The present invention allows for dynamic control of the bus-use right so as to provide usage of a bus with increased efficiency.

Further, the present invention allows for arbitrating the bus-use right in a distributing manner, preventing the circuit size of an arbiter from being increased due to an increased number of bus masters, and maintaining the high-speed operability of the bus.

According to one aspect of the present invention, there is provided an arbitrator configured to arbitrate accessing a bus by a plurality of modules. The arbitrator includes a detection unit configured to detect a free-space state of a buffer provided in each of the plurality of modules, so as to store data, and a control unit configured to control priority of accessing the bus by the plurality of modules according to the free-space state of each of the buffers.

According to another aspect of the present invention, there is provided an arbitrator configured to arbitrate accessing a bus by a plurality of modules. The arbitrator includes a request queue configured to stack at least one bus-access request transmitted from each of the plurality of modules, a detection unit configured to detect a number of the at least one bus-access request stacked on the request queue, and a control unit configured to control priority of accessing the bus according to the bus-access-request number of each of the plurality of modules.

According to still another aspect of the present invention, there is provided an information-processing apparatus including a plurality of modules, and a first arbitration unit configured to arbitrate bus-access requests transmitted from the plurality of modules. At least one of the modules includes a plurality of submodules, and a second arbitration unit configured to arbitrate bus-access requests transmitted from the plurality of submodules and to transmit at least one of the bus-access requests transmitted from the submodules to the first arbitration unit.

According to a further aspect of the present invention, there is provided a method for controlling an arbitrator configured to arbitrate accessing a bus by a plurality of modules. The method includes the steps of detecting a free-space state of a buffer provided in each of the plurality of modules, so as to store data, and controlling priority of accessing the bus according to the free-space state of each of the buffers.

According to a further aspect of the present invention, there is provided a method for controlling an arbitrator configured to arbitrate accessing a bus by a plurality of modules. The method includes the steps of detecting a number of at least one bus-access request transmitted from each of the plurality of modules, the bus-access request being stacked on a request queue on which the bus-access request transmitted from each of the plurality of modules is stacked, and controlling priority of accessing the bus according to the bus-access-request number of each of the plurality of modules.

Further features of the present invention will become apparent from the following description of exemplary embodiments (with reference to the attached drawings).

DESCRIPTION OF THE EMBODIMENTS

Hereinafter, exemplary embodiments of the present invention will be described in detail with reference to the attached drawings.

First Embodiment

[Configuration of Image-Processing Apparatus]

Figure 1:
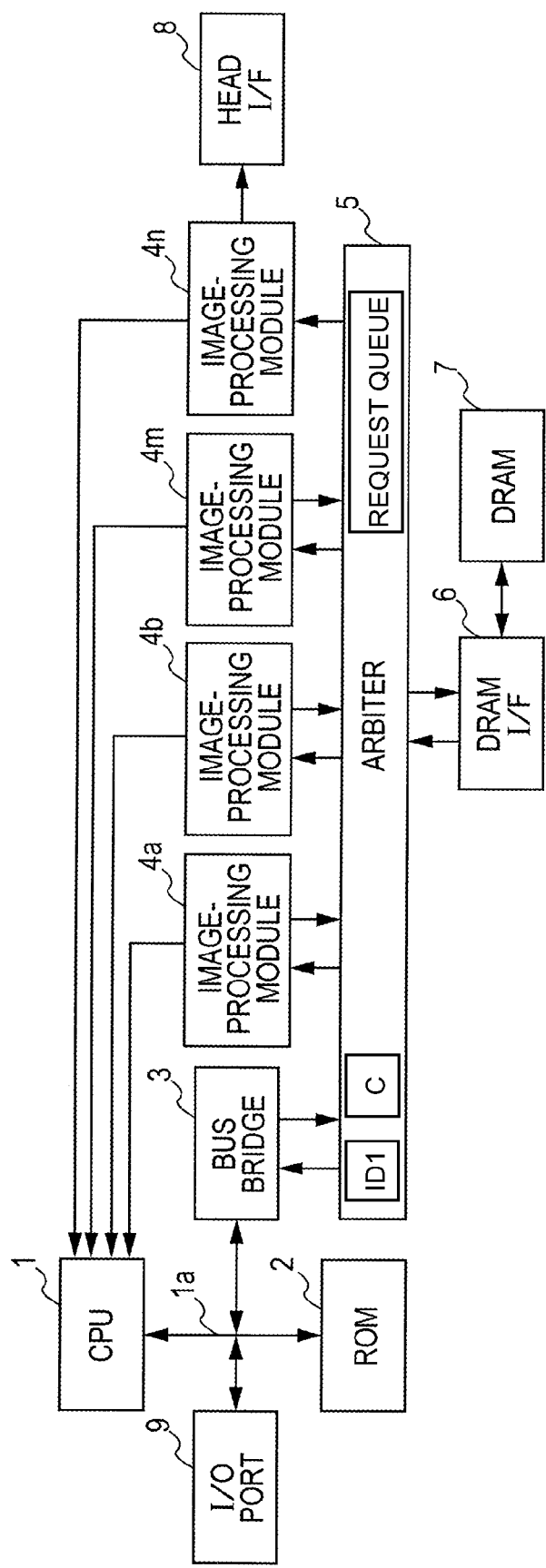
FIG. 1 is a block diagram showing an example configuration of an image-processing device according to a first embodiment of the present invention.

First, an example image-processing device configured to perform various types of image processing procedures and externally transmit signals of an image will be described. FIG. 1 is a block diagram illustrating an example configuration of an image-processing device according to a first embodiment of the present invention.

In FIG. 1, a central-processing unit (CPU) 1 controls the entire image-processing device by using a dynamic random access memory (DRAM) 7, as a work memory, according to a program stored in a read-only memory (ROM) 2. Further, the CPU 1 is connected to the ROM 2, a bus bridge 3, and an input/output (I/O) port 9 via a CPU bus 1*a*.

An arbiter 5 arbitrates an access made by the CPU 1 to the DRAM 7 via the bus bridge 3 and accesses made by n image-processing modules 4 (where an expression n≥1 holds and n is an integer) to the DRAM 7. Further, a DRAM interface (I/F) 6 is provided for the DRAM 7.

Further, one of the image-processing modules 4, e.g., the image-processing module 4*n* shown in FIG. 1 is connected to a print head of an ink-jet printer via a head interface (I/F) 8.

In FIG. 1, the DRAM 7 is shared among the CPU 1 and the image-processing modules 4. However, a random access memory (RAM) (not shown) specifically designed for the CPU 1 may be connected to the CPU bus 1*a*, so as to maintain and increase the performance of the image-processing device.

[Processing Operations]

The CPU 1 receives image data for processing, the image data being transmitted from the I/O port 9, according to a program stored in the ROM 2, and stores the image data in the DRAM 7 via the bus bridge 3, the arbiter 5, and the DRAM I/F 6. Next, the CPU 1 sets a configuration register of an image-processing module 4*a* so that the image-processing module 4*a* operates.

The image-processing module 4*a* performs predetermined processing. After data-for-processing which is set to the configuration register is read, or written, the image-processing module 4*a* generates and transmits an interrupt to the CPU 1, so as to inform the CPU 1 that the processing is finished.

Upon receiving the interrupt, the CPU 1 analyzes the cause of the interrupt generation. When the read processing performed by the image-processing module 4*a* is finished, the CPU 1 sets next data for processing and makes the image-processing module 4*a* continue performing the processing. Further, when the write processing performed by the image-processing module 4*a* is finished, the CPU 1 sets the place where the next data-for-processing is stored, makes the image-processing module 4*a* continue performing the processing, sets a configuration register for the next image-processing module 4*b*, and makes the image-processing module 4*b* operate.

The image-processing module 4*b* performs predetermined processing. After data-for-processing which is set to the configuration register is read, or written, the image-processing module 4*b* generates and transmits an interrupt to the CPU 1, so as to inform the CPU 1 that the processing is finished.

Upon receiving the interrupt, the CPU 1 analyzes the cause of the interrupt generation. When the read processing performed by the image-processing module 4*b* is finished, the CPU 1 sets next data for processing and makes the image-processing module 4*b* continue performing the processing. Further, when the write processing performed by the image-processing module 4*b* is finished, the CPU 1 sets the place where the next data-for-processing is stored, makes the image-processing module 4*b* continue performing the processing, sets a configuration register for the next image-processing module 4*c*, and makes the image-processing module 4*c* operate.

Thus, immediately after the previous processing performed by a predetermined image-processing module is finished, the next image-processing module is started and data-for-processing is transmitted to the next image-processing module. By performing the above-described operation repeatedly, a pipeline measured in image-processing modules can be formed.

When an image-processing module 4*m* finishes performing the above-described processing, bit-map data of a predetermined amount or more is generated. Subsequently, the CPU 1 starts a printer engine (not shown), makes an image-processing module 4*n* start performing processing in synchronization with a synchronization signal transmitted from the printer engine, and transmits the bit-map data to the printer engine via the head I/F 8 so that the printer engine prints an image of the bit-map data.

[Configuration of Image-Processing Module]

Figure 2:
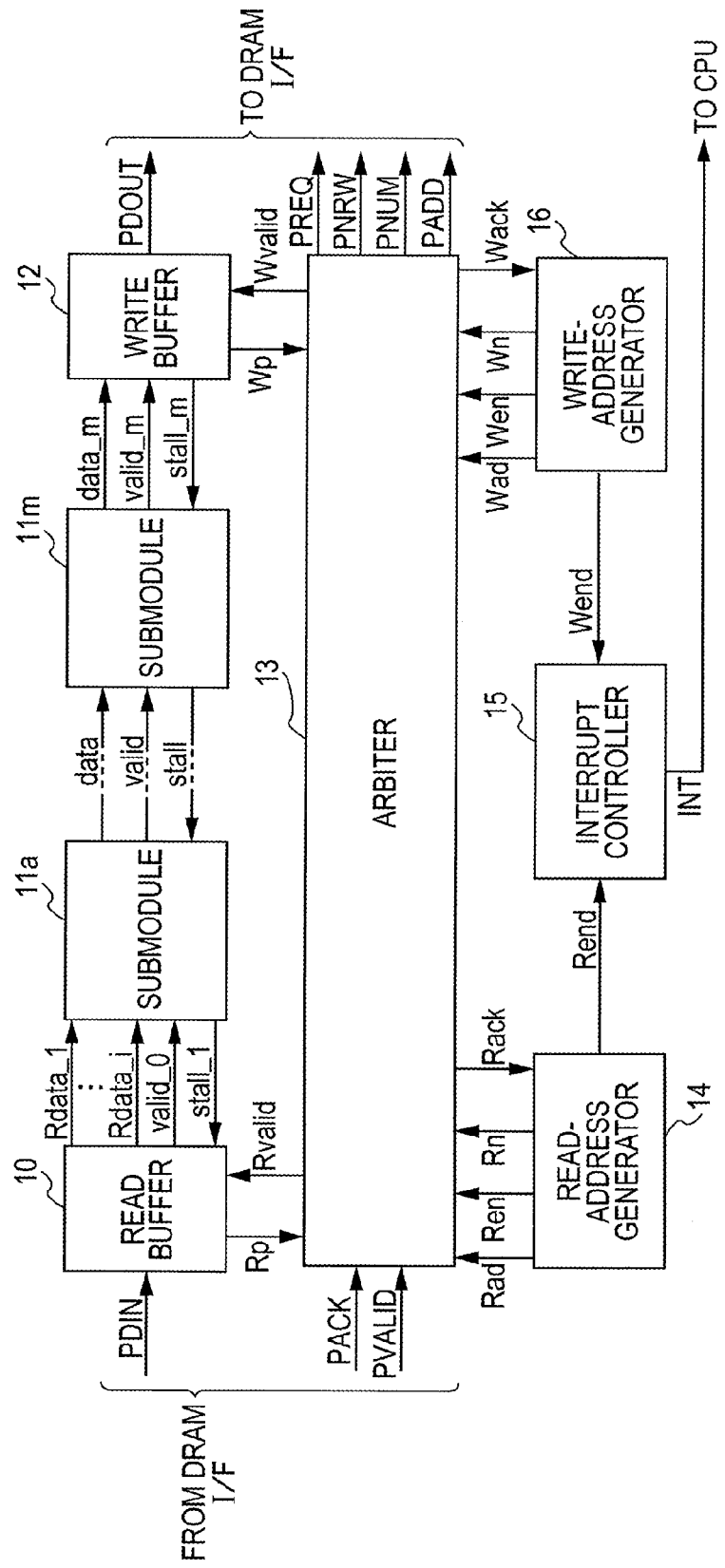
FIG. 2 is a block diagram illustrating an example configuration of an image-processing module in detail.

FIG. 2 is a block diagram illustrating an example configuration of an image-processing module 4 in detail. The image-processing module 4 includes a read buffer 10, m submodules 11 (where an expression m≥1 holds and m is an integer), a write buffer 12, an arbiter 13, a read-address generator 14, an interruption controller 15, and a write-address generator 16.

According to settings on the configuration register of the image-processing module 4, the CPU 1 sets information about read-start address and/or read-end address, and a read-enable signal Ren to the read-address generator 14. Further, the CPU 1 sets information about write-start address and/or write-end address, and a write-enable signal Wen to the write-address generator 16.

The arbiter 13 detects free space Rp of the read buffer 10 and the enable signal Ren of the read-address generator 14. If a read address is valid (Ren='1') and data can be stored in the read buffer 10 (Rp≥Rn), a read request (PREQ='1', PNRW='0', PNUM=Rn, and PADD=Rad) is issued and transmitted to the arbiter 5.

If the value of data-accumulation number Wp of the write buffer 12 becomes greater than a predetermined word number (Wp≥Wn), the arbiter 13 detects the enable signal Wen of the write-address generator 16. If a write address is valid (Wen='1'), the arbiter 13 issues and transmits a write request (PREQ='1', PNRW='1', PNUM=Wn, and PADD=Wad) to the arbiter 5.

Upon receiving the request signal PREQ transmitted from the image-processing module 4, the arbiter 5 determines whether the request signal PREQ indicates the read request or the write request according to information represented by PNRW, and detects the word number according to information represented by PNUM and the read and/or write address according to information represented by PADD. If no request is transmitted from the CPU 1 and any of the other image-processing modules 4 at that time, the arbiter 5 starts accessing the address of the DRAM 7 via the DRAM I/F 6. If a request is received by the DRAM I/F 6, the arbiter 5 returns a reception signal PACK to the image-processing module 4 which is the request source. On the other hand, when a request is transmitted from the CPU 1 and any of the other image-processing modules 4, the arbiter 5 receives the request in decreasing order of priority.

Where the reception signal PACK is transmitted and the request is a read request, the arbiter 13 transmits a reception signal Rack to the read-address generator 14 which is the request source. When the reception signal PACK is transmitted and the request is a write request, the arbiter 13 transmits a reception signal Wack to the write-address generator 16 which is the request source.

Upon receiving the reception signal Rack, the read-address generator 14 generates the next address. If the address for which the request was issued is a read-end address, the read-address generator 14 resets the read-enable signal Ren and transmits a read-end signal Rend to the interrupt controller 15. Upon receiving the reception signal Wack, the write-address generator 16 generates the next address. If the address for which the request was issued is a write-end address, the write-address generator 16 resets the write-enable signal Wen and transmits a write-end signal Wend to the interrupt controller 15.

The interrupt controller 15 can set a read-end-interrupt mask and a write-end-interrupt mask by using the configuration register. If the settings on each of the interrupt masks represent enable interruption, the interrupt controller 15 generates an interrupt signal INT according to the read-end signal Rend and/or the write-end signal Wend, and transmits the interrupt signal INT to the CPU 1.

Upon receiving the interrupt signal INT, the CPU 1 reads information about the status of the interrupt controller 15. If the interrupt signal is generated because the read processing is finished, the CPU 1 resets the read-end-interrupt mask and cancels the interrupt signal INT. If the processing needs to be continued, the CPU 1 sets the read-start address and the read-end address again, sets the read-enable signal Ren, and sets the read-end-interrupt mask. Further, if the interrupt signal is generated because the write processing is finished, the CPU 1 resets the write-end-interrupt mask and cancels the interrupt signal INT. If the processing needs to be continued, the CPU 1 sets the write-start address and the write-end address again, sets the write-enable signal Wen, and sets the write-end-interrupt mask.

Next, when data is read from the DRAM 7, the arbiter 5 transmits a DRAM-data-valid signal PVALID to the image-processing module 4 which is the request source. The arbiter 13 of the image-processing module 4 transmits a data-valid signal Rvalid to the read buffer 10. The read buffer 10 stores data on a DRAM-data output signal PDIN over a period of time during the data-valid signal Rvalid is set. Subsequently, the data on the DRAM 7 is stored in the read buffer 10.

On the other hand, when data is written into the DRAM 7, the arbiter 5 transmits the DRAM-data-valid signal PVALID to the image-processing module 4 which is the request source at the time where the data is written into the DRAM 7. The arbiter 13 of the image-processing module 4 which is the request source transmits a data-valid signal Wvalid to the write buffer 12. The write buffer 12 transmits data to be written into the DRAM 7, as a DRAM-data-input signal PDOUT over a period of time during the data-valid signal Wvalid is set. Subsequently, the data on the write buffer 12 is stored in the DRAM 7.

When every data item required for processing performed by a submodule 11a is prepared, the read buffer 10 sets a valid signal valid_0. Otherwise, the read buffer 10 rests the valid signal valid_0.

When a store-request signal stall_0 transmitted from the submodule 11a is not set, the read buffer 10 externally transmits the data stored therein in synchronization with a clock signal. However, when the store-request signal stall_0 is set, the read buffer 10 does not update the data stored therein.

The submodule 11a only receives data for which the valid signal valid_0 is set. If it is difficult for the submodule 11a to receive such data, the submodule 11a sets the store-request signal stall_0 and holds a signal transmitted from the read buffer 10. If there is no need to rearrange input data items, the read buffer 10 may be formed, as a first-in-first-out (FIFO) memory. Likewise, if there is no need to rearrange output data items, the write buffer 12 may be formed, as the FIFO memory.

The image-processing module 4 includes at least one submodule 11 configured to perform image processing. If there are two submodules 11, the same operations as those described above (i.e., hand shaking by using a valid signal valid_x and a store-request signal stall_x) are performed between the submodules 11 so that the data data_x is transmitted and/or received between the submodules 11.

[Data Transfer Performed Between Submodules]

Figure 3:
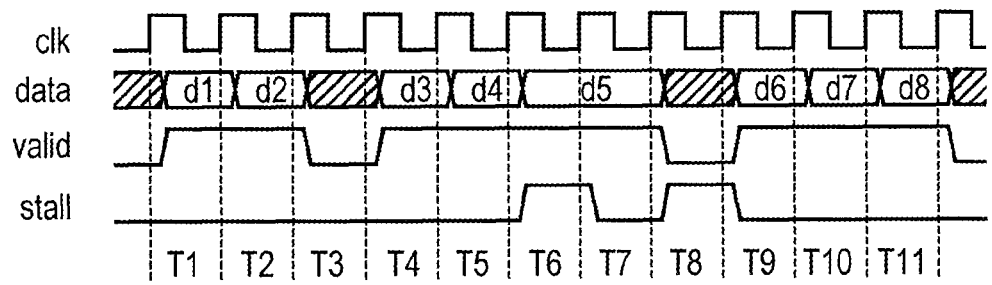
FIG. 3 is a timing chart illustrating data transfer performed between submodules.

FIG. 3 is a timing chart illustrating data transfer performed between the submodules 11. When data can be transmitted, the submodule 11 on the data-transmission side sets a data signal d1 and a valid signal valid in synchronization with the rise of a clock signal clk (T1). If the store-request signal stall is not set by the submodule 11 on the reception side in synchronization with the rise of the next signal, it is determined that the data signal d1 is received. Then, if the next data can be transmitted, the submodule 11 on the data-transmission side sets a data signal d2 and the valid signal valid (T2). If it is difficult to transmit the next data, the submodule 11 on the data-transmission side resets the valid signal valid (T3).

When the submodule 11 on the reception side sets the store-request signal stall at the rise of the next clock signal, it is determined that the data signal is not received and a data signal d5 and the valid signal valid are held (T7). Further, if the valid signal valid is not set, even though the store-request signal stall is set by the submodule 11 on the reception side (T8), the data signal d5 is invalid. In that case, the submodule 11 on the reception side transmits a data signal d6, as the next valid data, and sets the valid signal valid without holding the data signal d5 and the valid signal valid (T9). That is to say, when the valid signal valid is not set, the store-request signal stall is ignored.

When the submodule 11 on the data-reception side can receive data, it receives a data signal to which the valid signal valid is set in synchronization with the rise of the clock signal clk (T1, T2, T4, and T5). If it is difficult for the submodule 11 on the data-reception side to receive data, the above-described submodule 11 sets the store-request signal stall and makes the submodule 11 on the transmission side store the data signal d5 and the valid signal valid (T6). Then, when the submodule 11 on the data-reception side becomes capable of receiving data, it resets the store-request signal stall and the data signal d5 transmitted thereto (T7).

If the write buffer 12 has free space, it stores a data signal data_n obtained when the submodule 11 sets a valid signal valid_n. If the write buffer 12 has no free space, it sets the store-request signal stall_n and makes the submodule 11 hold an output signal.

[Operation Algorithm of Arbiter 13 in Image-Processing Module]

Figure 4:
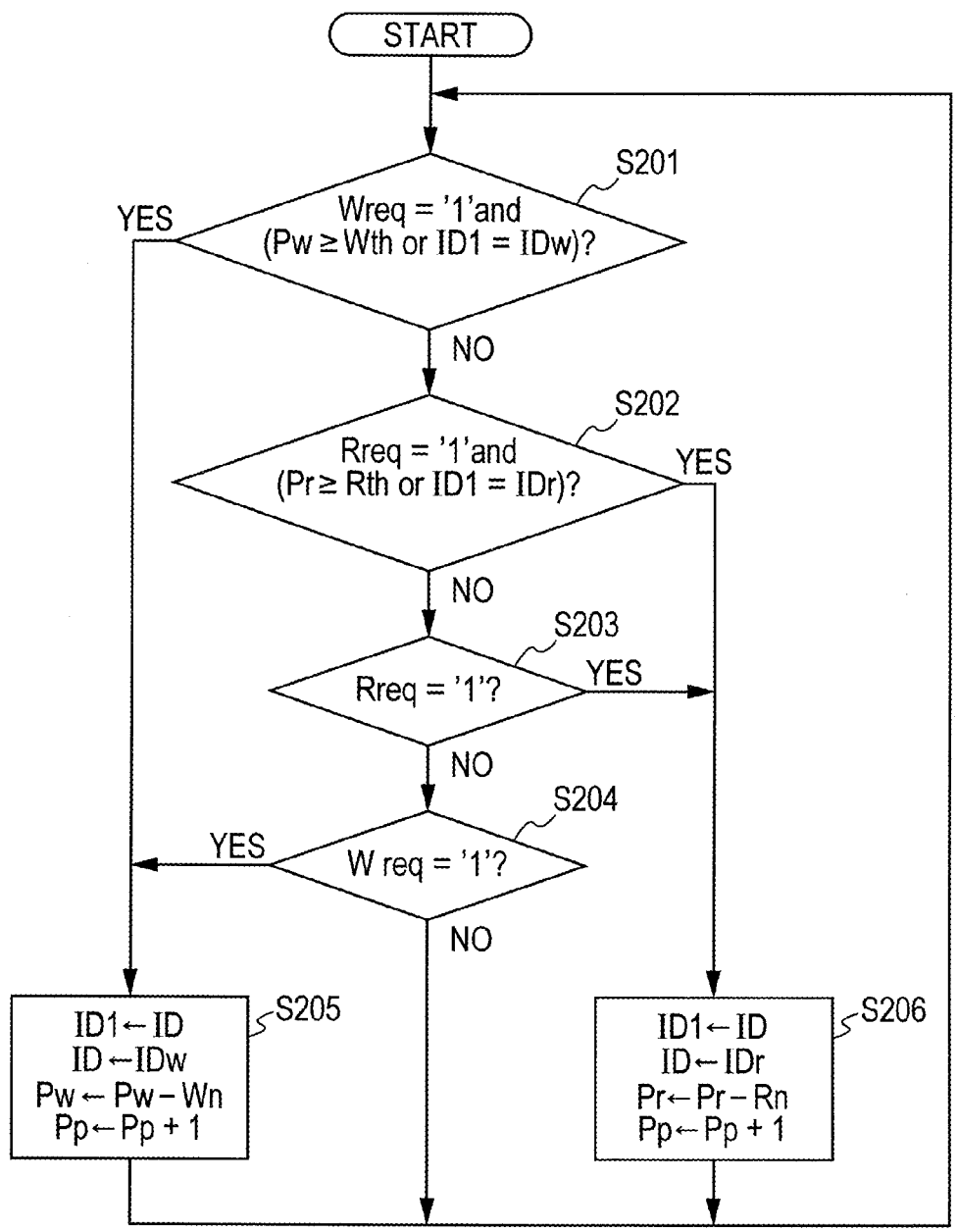
FIG. 4 is a flowchart illustrating an operation algorithm of an arbiter provided in the image-processing module.

FIG. 4 is a flowchart illustrating an operation algorithm of the arbiter 13. Hereinafter, the number of requests accumulated on a request queue is determined to be Pp, the number of data items accumulated on the write buffer 12 (evaluation value) when the request accumulated on the request queue is executed is determined to be Pw, and free space of the read buffer 10 when the request accumulated on the request queue is executed (evaluation value) is determined to be Pr. When the arbiter 5 receives the request (PACK='1'), the value of Pp is decremented by one. Hereinafter, the presumption is made that the frequency of read-request generation is greater than that of write-request generation. Further, information about the state of free space of a buffer which will be described later is detected for each of the modules in ascending order of the generation frequency of a request for bus access.

When the evaluation value Pw of the number of data items accumulated on the write buffer 12 is greater than the predetermined word number Wn (Pw≧Wn) and the write address is valid (Wen='1'), the write request Wreq can be represented by the expression Wreq='1'. Further, when the evaluation value Pr of free space of the read buffer 10 is greater than a predetermined word number Rn (Pr≧Rn) and the read address Ren is valid (Ren='1'), the read request Rreq can be represented by the expression Rreq='1'.

First, in step S201, it is determined whether the write request Wreq is represented by the expression Wreq='1', and the relationship between the evaluation value Pw and the predetermined value Wth is represented by the expression Pw≧Wth, or the preceding request accumulated on the request queue is the write request, which is represented by the expression ID1=IDw. If so, flow proceeds to step S205, where the write request is accumulated on the request queue.

If the above-described conditions are not satisfied, flow proceeds to step S202, where it is determined whether the read request is represented by the expression Rreq='1' and the relationship between the evaluation value Pr and the predetermined value Rth is represented by the expression Pr≧Rth, or the preceding request accumulated on the request queue is the read request, which is represented by the expression ID1=IDr. If so, flow proceeds to step S206, where the read request is accumulated on the request queue.

If the above-described two conditions are not satisfied and the read request Rreq is represented by the expression Rreq='1', in step S203, flow proceeds to step S206, where the read request Rreq is accumulated on the request queue. If the read request Rreq is not represented by the expression Rreq='"1", flow proceeds to step S204. If, in step S204, the write request Wreq is represented by the expression Wreq='1', then in step S205, the write request Wreq is accumulated on the request queue.

When, in step S205, the write request Wreq is accumulated on the request queue, the current request-identification code ID is stored in a next previous request-identification-code register ID1 and the current request-identification code ID is updated to a write-request-identification code IDw. At the same time, the write-data number Wn is subtracted from the evaluation value Pw so that the evaluation value Pw is updated. Further, the value of request number Pp, which indicates the requests accumulated on the request queue, is incremented by one.

Further, in step S206, when the read request Rreq is accumulated on the request queue, the current request-identification code ID is stored in the next previous request-identification-code register ID1 and the current request-identification code ID is updated to a read-request-identification code IDr. At the same time, the read-data number Rn is subtracted from the evaluation value Pr so that the evaluation value Pr is updated. Further, the value of request number Pp indicating the number of requests accumulated on the request queue is incremented by one.

After the above-described processing procedures are finished, the processing returns to step S201 so that the above-described processing procedures are performed again. There is no need to set a ceiling on the request number Pp indicating the number of requests accumulated on the request queue, since the capacity of each of the buffers, the sequence of the arbiter 5, and so forth impose a limit on the request number Pp. However, if there is a need to set a ceiling on the request number Pp according to the system configuration, it may be configured so that the maximum value is set for the request number Pp so that when the value of the request number Pp reaches the maximum value, the expression Rreq=Wreq=0 holds.

[Operation Algorithm of Arbiter 5 of Image-Processing Apparatus]

Figure 5:
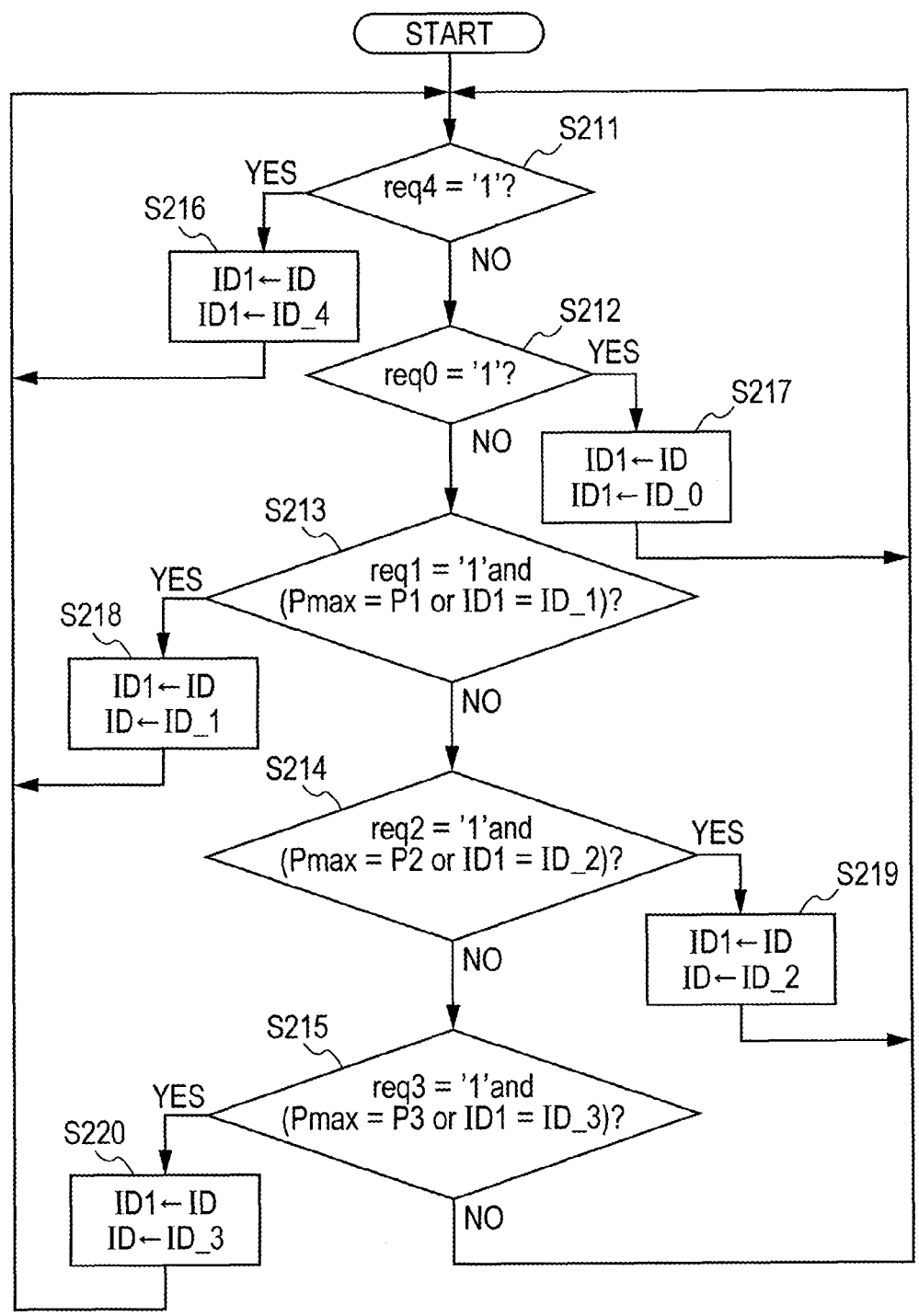
FIG. 5 is a flowchart illustrating an operation algorithm of an arbiter provided in the image-processing device.

FIG. 5 is a flowchart showing an operation algorithm of the arbiter 5. In the following description, three image-processing modules M1, M2, and M3, an engine-processing module M4, and a bus bridge B0 are connected to the arbiter 5. The highest priority is given to the engine-processing module M4, so as to perform real-time control. The second highest priority is given to the bus bridge B0. The priority of the three image-processing modules M1, M2, and M3 are the same as one another. Therefore, the priority of the above-described modules can be represented by the following expression:

M4>B0>M1,M2, and M3.

First, in step S211, the arbiter 5 determines whether the engine-processing module M4 with the highest priority transmits a request req4 for a bus-use right, which is shown by the expression req4='1'. If the expression req4='1' holds, then in step S216, the arbiter 5 receives the request req4, stores the current request-identification code ID in the next previous request-identification-code register ID1, and updates the current request-identification code ID to a request-identification code ID_4 of the engine-processing module M4. Then, the arbiter 5 transmits the reception signal PACK to the engine-processing module M4 and the processing returns to step S211.

If, in step S211, the engine-processing module M4 does not transmit the request req4, then in step S212, the arbiter 5 determines whether the bus bridge B0 transmits a request req0, which is shown by the expression req0='1'. If the expression req0='1' holds, flow proceeds to step S217, where the arbiter 5 receives the request req0, stores the current request-identification code ID in the next previous request-identification-code register ID1, and updates the current request-identification code ID to a request-identification code ID_0 of the bus bridge B0. Then, the arbiter 5 transmits the reception signal PACK to the bus bridge B0 and the processing returns to step S211.

If, in step S216, the bus bridge B0 does not transmit the request req0, then in step S212, the arbiter 5 determines whether the image-processing module M1 transmits a request req1, which is shown by the expression req1='1'. If the expression req1='1' holds, the arbiter 5 determines whether the value of a request number P1 of the image-processing module M1, the request number P1 indicating the number of requests accumulated on the request queue, is the largest of those of the three image-processing modules M1, M2, and M3. That is to say, the arbiter 5 determines whether the expression P1=Pmax holds. Further, the arbiter 5 determines whether a next previous request transmitted thereto is a request transmitted from the image-processing module M1, which is shown by the expression ID1=ID_1. If the determination result is shown by the expression reg1='1', and the expression P1=Pmax or the expression ID1=ID_1 holds, the arbiter 5 receives the request reg1. Then, in step S218, the arbiter stores the current request-identification code ID in the next previous request-identification-code register ID1, and updates the current request-identification code ID to a request-identification code ID_1 of the image-processing module M1. Then, the arbiter 5 transmits the reception signal PACK to the image-processing module M1 and the processing returns to step S211.

Further, if the expression reg1='0' and/or the expression P1≠Pmax holds, and the expression ID1≠ID_1 holds, flow proceeds to step S214, where the arbiter 5 performs the same processing as that performed for the image-processing module M1 for the image-processing module M2. That is to say, the arbiter 5 determines whether a request req2 is transmitted, which is shown by the expression req2='1', and a request number P2 is the largest of those of the image-processing modules M1, M2, and M3, which is shown by the expression P2=Pmax, or a next previous request is transmitted from the image-processing module M2, which is shown by the expression ID1=ID_2. If the determination result is shown as the expression req2='1', and the expression P2=Pmax or the expression ID2=ID_2 holds, the arbiter 5 receives the request req2. Then, in step S219, the arbiter 5 stores the current request-identification code ID in the next previous request-identification-code register ID1, and updates the current request-identification code ID to a request-identification code ID_2 of the image-processing module M2. Then, the arbiter 5 transmits the reception signal PACK to the image-processing module M2 and the processing returns to step S211.

If the expression req2='0' and/or the expression P2≠Pmax holds, and the expression ID2≠ID_2 holds, the arbiter 5 performs the same processing as those performed for the image-processing modules M1 and M2 for the image-processing module M3, in steps S215 and S220, and the processing then returns to step S211.

As for the priority of the three image-processing modules M1, M2, and M3, the highest priority may be given to the image-processing module whose value of the request number P1 is the highest, or the image-processing module which transmits the same request as the next previous request.

According to the above-described algorithm, the priority order is partially fixed. Therefore, if a bus master with a high priority, such as the engine-processing module M4 and the bus bridge B0, transmits a request for the bus-use right at frequent intervals, the bus master may exclusively use the bus. Particularly, according to the above-described configuration, the priority of the engine-processing module M4 is higher than that of the bus bridge B0. Subsequently, the responsivity to a request of the CPU 1 is deteriorated in predetermined timing. Further, in the case of the image-processing modules M1, M2, and M3, the highest priority is given to a next-previous request transmitted thereto. Therefore, a predetermined one of the image-processing modules may exclusively use the bus. In that case, an upper limit is set for the consecutive-access number, so as not to let a predetermined bus master exclusively use the bus.

Figure 6:
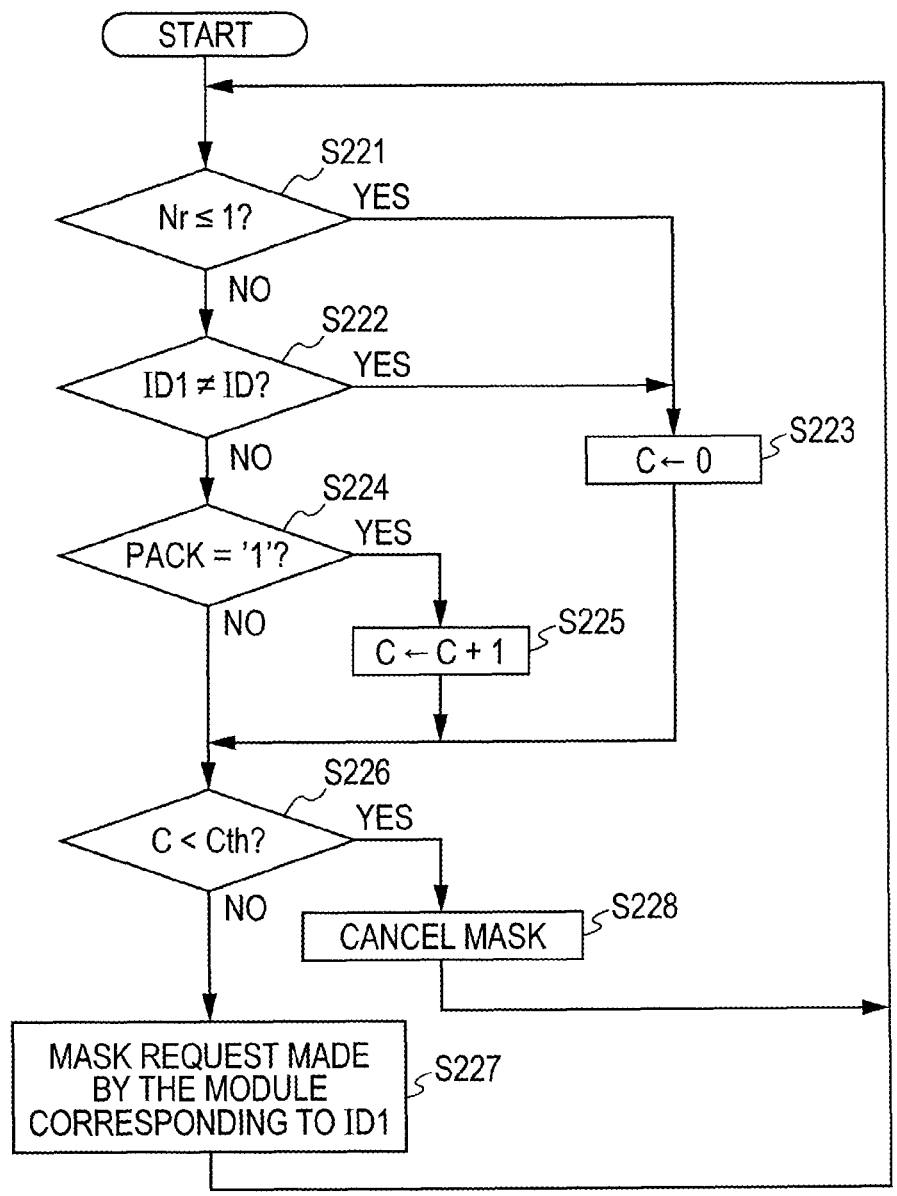
FIG. 6 is a flowchart illustrating an algorithm adapted to restrict consecutive bus accesses.

FIG. 6 is a flowchart illustrating an algorithm used for limiting the number of consecutive accesses to the bus.

First, in step S221, a module number Nr indicating the number of modules which currently transmits requests is detected. Next, a comparison between the value of the current request-identification code ID and that of the next previous request-identification-code register ID1 is made in step S222. If the expression Nr≤1 or the expression ID1≠ID holds, then in step S223, the value of a counter C is reset to zero.

If, the expression Nr>1 and the expression ID1=ID hold, then in step S224, a determination is made whether the reception signal PACK=1 (i.e., reception signal PACK is transmitted to the module which is a target). If PACK=1, flow proceeds to step S225, where the counter C is incremented every time the reception signal PACK is transmitted to the module which is a target.

By repeating the above-described processing procedures shown in FIG. 6, the number of consecutive bus accesses made by the same module (hereinafter referred to as the consecutive-bus-access number) is counted by the counter C. In step S226, a determination is made whether the counter C has reached a predetermined value Cth. While the value of the counter C is less than the predetermined value. When the value of the counter C reaches the predetermined value, flow proceeds to step S227, where the arbiter 5 masks a request transmitted from the module indicated by the next previous request-identification-code register ID1. While the value of the counter C is less than the predetermined value, the mask of the request is cancelled in step S228.

According to the above-described configuration, it becomes possible to receive a request transmitted from the module different from the above-described module so that the consecutive-bus-access number is limited. Further, once the bus-use right is moved to the different module, the value of the counter C is reset through the processing procedures performed in steps S221 to S223.

In FIG. 6, the counter C which counts the consecutive-bus-access number is shared among all of the above-described modules. However, the counter C may be provided in each of the modules so that the consecutive-bus-access number can be limited by each of the modules. For example, if the limited value of the bus bridge B0 is adjusted to the line size of a cache of the CPU 1, it becomes possible to efficiently update the value of the cache.

Further, when the above-described modules access different banks of the DRAM 7, the continuity of the bus accesses may not be considered. Subsequently, a comparison between the currently used request-identification code ID and the next previous request-identification-code register ID1 may not be made.

Thus, by dynamically changing (controlling) the bus-access priority according to the free-space status of the buffer, the next previous access, and the number of consecutive accesses, it becomes possible to arbitrate the bus accesses according to the bus-use frequency of each of the bus masters while increasing the bus-access continuity.

Further, since the arbitration is performed not only by the arbiter 5 of the entire image-processing device but also the arbiter 13 provided in each of the modules (the distributed arbitration), it becomes possible to perform arbitration suited for each of the modules. For example, if the request-generation occurrences of the bus masters are different from one another, the pointer evaluation and the consecutive-access-number evaluation are performed in ascending order of the request-generation occurrences. By giving a higher priority to the bus master with low request-generation occurrence, the rate of obtaining the bus-use right of the bus master with the low request-generation occurrence is increased and the processing equalization is achieved. If the request-generation occurrences of the bus masters are almost the same as one another, a higher priority is given to the bus master according to the write access made thereby. This is because the latency required for performing write processing is shorter than that required for performing read processing and a time period until a memory bus is opened is short.

Second Embodiment

Hereinafter, image processing performed according to a second embodiment of the present invention will be described. In the second embodiment, the same elements as those of the first embodiment are designated by the same reference numerals and the description thereof is omitted.

Figure 7:
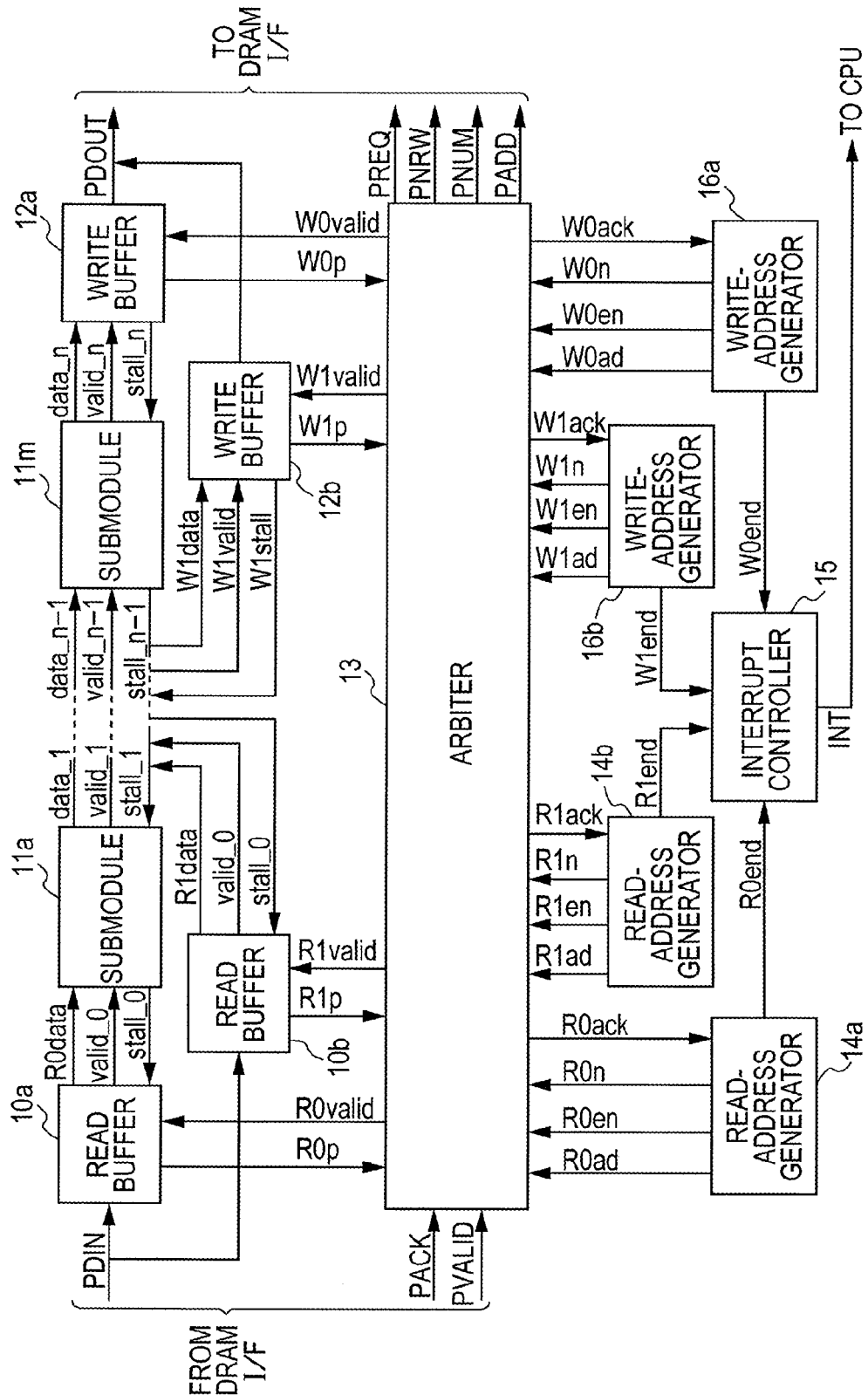
FIG. 7 is a block diagram illustrating an example configuration of an image-processing module according to a second embodiment of the present invention.

FIG. 7 is a block diagram illustrating an example configuration of an image-processing module according to the second embodiment. The image-processing module shown in FIG. 7 is different from the image-processing module shown in FIG. 2 in that two read buffers $10a$ and $10b$, two write buffers $12a$ and $12b$, two read-address generators $14a$ and $14b$, and two write-address generators $16a$ and $16b$ are provided therein.

The arbiter 13 detects information about buffer space $R0p$ which indicates free space of the read buffer $10a$ and an enable signal R0en of the read-address generator $14a$. If the read address is valid (R0en='1'), and the read buffer $10a$ can store data ($R0p \geq R0n$), the arbiter 13 transmits a read request (PREQ='1', PNRW='0', PNUM=Rn, and PADD=Rad) to the arbiter 5. Likewise, the arbiter 13 detects information about buffer space $R1p$ which indicates free space of the read buffer $10b$ and an enable signal R1en of the read-address generator $14b$. If the read address is valid (R1en='1'), and the read buffer $10b$ can store data ($R1p \geq R1n$), the arbiter 13 transmits a read request (PREQ='1', PNRW='0', PNUM=Rn, and PADD=Rad) to the arbiter 5.

If accumulated-data number $W0p$ indicating the number of data items accumulated on the write buffer $12a$ becomes greater than a predetermined word number ($W0p \geq W0n$), the arbiter 13 detects an enable signal W0en transmitted from the write-address generator $16b$. When a write address is valid (W0en='1'), the arbiter 13 transmits a write request (PREQ='1', PNRW='1', PNUM=Wn, and PADD=Wad) to the arbiter 5. Likewise, if accumulated-data number $W0p$ indicating the number of data items accumulated on the write buffer $12b$ becomes greater than a predetermined word number ($W1p \geq W1n$), the arbiter 13 detects an enable signal W1en transmitted from the write-address generator $16b$. When a write address is valid (W1en='1'), the arbiter 13 transmits a write request shown (PREQ='1', PNRW='1', PNUM=Wn, and PADD=Wad) to the arbiter 5.

Figure 8:
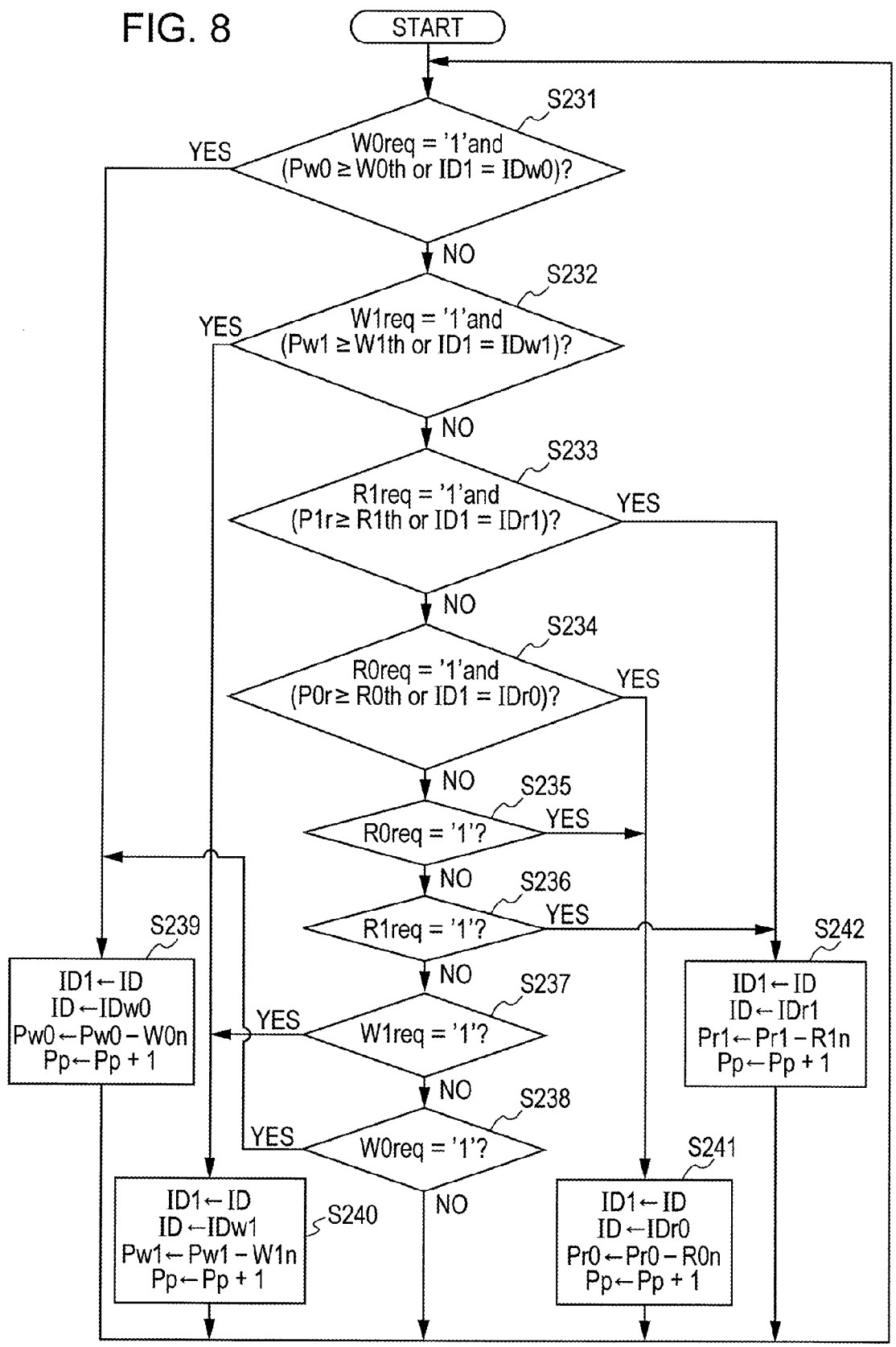
FIG. 8 is a flowchart illustrating an operation algorithm of an arbiter according to the second embodiment of the present invention.

FIG. 8 is a flowchart illustrating an operation algorithm of the arbiter 13 of the second embodiment. As is the case with the first embodiment, the number of data items accumulated on the write buffer $12a$ (evaluation value), when the request accumulated on the request queue is executed, is determined to be Pw0, the number of data items accumulated on the write buffer $12b$ (evaluation value) is determined to be Pw1, free space of the read buffer $10a$ when the request accumulated on the request queue is executed (evaluation value) is determined to be Pr0, and the free space of the read buffer $10b$ (evaluation value) is determined to be Pr1. When the arbiter 5 receives the request (PACK='1'), the value of Pp is decremented by one. Hereinafter, the presumption is made that the expression (the request-generation occurrence of the read buffer $10a$)>(the request-generation occurrence of the read buffer $10b$)=(the request-generation occurrence of the write buffer $12b$)>(the request-generation occurrence of the write buffer $12a$) holds. Further, information about the free-space state of the buffer is detected for each of the modules in ascending order of the bus-access-request-generation occurrences.

When the evaluation value Pw0 of the number of data items accumulated on the write buffer $12a$ is greater than a predetermined word number $W0n$ ($Pw0 \geq W0n$) and the write address is valid (W0en='1'), a write request W0req of the write buffer $12a$ can be represented by the expression W0req='1'. Further, when the evaluation value Pw1 indicating the number of data items accumulated on the write buffer $12b$ is greater than a predetermined word number $W1n$ ($Pw1 \geq W1n$) and the write address W1en is valid (W1en='1'), a write request W1req of the write buffer $12b$ can be represented by the expression W1req='1'.

When the evaluation value Pr0 indicating the free space of the read buffer $10a$ is greater than a predetermined word number $R0n$ ($Pr0 \geq R0n$) and the read address is valid (R0en='1'), the read request R0req of the read buffer $10a$ can be represented by the expression R0req='1'. Further, when the evaluation value Pr1 indicating the free space of the read buffer $10b$ is greater than a predetermined word number $R1n$ ($Pr1 \geq R1n$) and the read address Ren is valid (R1en='1'), the read request R1req of the read buffer $10b$ can be represented by the expression R1req='1'.

First, in step S231, it is determined whether the write request W0req is represented by the expression W0req='1', and the evaluation value Pw0 is greater than the predetermined value W0th, or a next previous request accumulated on the request queue is the write request of the write buffer $12a$ (ID1=IDw0). If so, then in step S239, the write request of the write buffer $12a$ is accumulated on the request queue.

If the above-described conditions are not satisfied, flow proceeds to step S232, where it is determined whether the write request W1req is represented by the expression W1req=1, and the evaluation value P1w indicating the number of data items accumulated on the write buffer $12b$ is greater than a predetermined value W1th, or a next previous request accumulated on the request queue is the write request IDw1 of the write buffer $12b$ (ID1=IDw1). If so, then in step S240, the write request of the write buffer $12b$ is accumulated on the request queue.

If the above-described two conditions are not satisfied, then in step S233, it is determined whether read request Rreq is represented by the expression Rreq='1', and the evaluation value Pr1 indicating the free space of the read buffer $10b$ is equivalent to or higher than a predetermined value R1th, or a next previous request accumulated on the request queue is a read request of the read buffer $10b$ (ID1=IDr1). If so, flow proceeds to step S242, where the read request of the read buffer $10b$ is accumulated on the request queue.

If the above-described three conditions are not satisfied, it is determined in step S234 whether the read request R0req is represented by the expression R0req='1', and the evaluation value Pr0 indicating the free space of the read buffer $10a$ is equivalent to or higher than a predetermined value R0th, or a next previous request accumulated on the request queue is a read request of the read buffer $10a$ (ID1=IDr0). If so, in step S241, the read request of the read buffer $10a$ is accumulated on the request queue.

If the above-described four conditions are not satisfied, the following processing is performed according to each of the requests. If, in step S235, the read request R0req="1", then the read request of the read buffer $10a$ is accumulated on the request queue in step S241. If, in step S236, the read request R1req='1', then the read request of the read buffer $10b$ is accumulated on the request queue in step S242. If, in step S237, the write request W1req='1', then the write request of the write buffer $12b$ is accumulated on the request queue in step S240. If, in step S238, the write request W0req='1', then the write request of the write buffer 12a is accumulated on the request queue in step S239.

When the write request of the write buffer 12a is accumulated on the request queue in step S239, the current request-identification code ID is stored in the next previous request-identification-code register ID1 and the current request-identification code ID is updated to a write-request-identification code IDw0. At the same time, the write-data number W0n is subtracted from the evaluation value PW0 indicating the number of data items accumulated on the write buffer 12a so that the evaluation value Pw0 is updated, and the request number Pp indicating the number of data items accumulated on the request queue is incremented by one.

When the write request of the write buffer 12b is accumulated on the request queue in step S240, and the read request of the read buffer 10a and/or the read buffer 10b is accumulated on the request queue in step S241 and/or step S242, the same processing as the above-described processing is performed. That is to say, the current request-identification code ID is stored in the next previous request-identification-code register ID1 and the current request-identification code ID is updated. At the same time, the data number is subtracted from the evaluation value of the buffer so that the evaluation value is updated, and the request number Pp indicating the number of data items accumulated on the request queue is incremented by one.

After the above-described processing is finished, the processing returns to step S231 so that the above-described processing is performed again.

Each of the above-described modules includes two data paths. For example, where an error buffer of an error-diffusion circuit of the module is provided on the DRAM7, a data path used for image data and a data path used for the error buffer are provided. Subsequently, the number of the bus masters is increased from two to four, which makes it difficult to connect the bus masters to the memory bus. In that case, the above-described arbitration is performed in each of the modules and the modules are connected to the memory bus. Thus, it becomes possible to connect the modules to the memory bus without changing the configuration of upper circuits.

Further, as described above, the arbitration is performed not only by the arbiter 5 but also by the arbiter 13 provided in each of the modules (arbitration distribution), which allows suitable arbitration to be performed for each of the modules. For example, if the request-generation occurrences of the bus masters are different from one another, the pointer evaluation and the consecutive-access-number evaluation are performed in ascending order of the request-generation occurrences. By giving a higher priority to the bus master with low request-generation occurrence, the rate at which the bus master with low request-generation occurrence obtains the bus-use right is increased and the processing equalization is achieved. If the request-generation occurrences of the bus masters are almost the same, a higher priority is given to the bus master who made write access. This is because the latency and a time period until the memory bus is opened that are required for performing write processing are shorter than those required for performing read processing.

Further, the consecutive-access number may be limited by using the counter C which counts the consecutive-access number, as shown in FIG. 6. The use of the counter C allows the processing equalization to be achieved without considering the above-described generation occurrence.

Further, threshold values W0th, W1th, R0th, and R1th that are compared to the above-described evaluation values Pw0, Pw1, Pr0, and Pr1 may be set, so as to perform more advanced arbitration. In that case, priority may be set in decreasing order of the threshold values and the consecutive-access number may be determined when the evaluation value is compared to the largest threshold value. Thus, optimization can be performed for each of the modules so that the use efficiency of the memory bus is easily increased.

In the above-described embodiments, the arbitration is performed for access to the memory bus. However, without being limited to the memory bus, the present invention can be used for arbitrating the use right of buses of various kinds.

According to the above-described embodiments, the bus-use efficiency can be increased by dynamically controlling the bus-use right. Further, by performing the bus-use right arbitration in a distributing manner, it becomes possible to prevent an increase in the circuit size due to an increase in the number of bus masters and to maintain the high-speed operability of the bus.

Other Embodiments

The present invention may be used for a system including a plurality of apparatuses including a host computer, an interface, a reader, a printer, and so forth, or an apparatus which is formed, as one unit including a copier, a facsimile machine, and so forth.

It is to be understood that the object of the present invention can also be achieved by a computer (CPU, MPU, etc.) of the apparatus or system, the computer being provided, so as to read a program code of software for implementing the functions of the above-described embodiments from a storage medium storing the program code and execute the program code. In that case, the program code itself, read from the storage medium, achieves the functions of the above-described embodiments, and thus the storage medium storing the program code constitutes the present invention. Furthermore, not only by the computer reading and executing the program code, but also by the computer executing part of or the entire process utilizing an operating system (OS), etc. running on the computer based on instructions of the program code, the functions of the above-described embodiments may be achieved. The latter is also one of embodiments of the present invention.

In another embodiment of the present invention, the program code read from the storage medium may be written to a memory of a function extension card inserted in the computer or a function extension unit connected to the computer. The functions of the above-described embodiments may be realized by executing part of or the entire process by a CPU, etc. of the function extension card or the function extension unit based on instructions of the program code.

When the present invention is used for the above-described storage medium, the storage medium stores the program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-99420 filed on Mar. 30, 2005, which is hereby incorporated by reference herein in its entirety.

What is claimed is:

1. An arbiter configured to arbitrate access requests for a memory by a plurality of modules, the arbiter comprising:

an issuance unit configured to select and issue one of the access requests in a request queue which may store either a write request or a read request received from the plurality of modules;

an estimation unit configured to estimate data amount to be accumulated in a write buffer if write requests in the request queue are executed and amount of free space to be obtained in a read buffer if read requests in the requests queue are executed;

a register configured to store a type of access request representing whether a next-previous access request issued from the issuance unit is a read request or a write request; and a determination unit configured to determine the type of the next-previous access request stored in the register, and wherein the issuance unit preferentially selects a write request if the estimated data amount to be accumulated in the write buffer is greater than a first threshold and the next-previous access request is a write request, and selects a read request if the estimated data amount is not greater than the first threshold and the estimated amount of free space to be obtained in the read buffer is greater than a second threshold and the next-previous access request is a read request.

2. An information processing apparatus comprising:
a plurality of modules;
a memory; and
a first arbiter configured to arbitrate access requests for the memory by the plurality of modules,
wherein at least one of the plurality of modules comprises:
   a plurality of sub-modules; and
   a second arbiter configured to arbitrate the read request and the write request by the plurality of sub-modules, wherein the second arbiter comprises:
      an issuance unit configured to select and issue one of the access requests in a request queue which may store either a write request or a read request received from the plurality of sub-modules;
      an estimation unit configured to estimate data amount to be accumulated in a write buffer if write requests in the request queue are executed and amount of free space to be obtained in a read buffer if read requests in the requests queue are executed;
      a register configured to store a type of access request representing whether a next-previous access request issued from the issuance unit is a read request or a write request; and
   a determination unit configured to determine the type of the next-previous access request stored in the register, and
   wherein the issuance unit preferentially selects a write request as if the estimated data amount to be accumulated in the write buffer is greater than a first threshold and the next-previous access request is a write request, and selects a read request if the estimated data amount is not greater than the first threshold and the estimated amount of free space to be obtained in the read buffer is greater than a second threshold and the next-previous access request is a read request.

3. The apparatus according to claim 2, wherein the first arbiter determines whether pending access requests include an access request issued from the next-previous access module by comparing identifiers of the pending access requests with the identifier of the next-previous access module stored in the register, and the arbiter gives the priority to the next-previous access module if it is determined that the pending access requests include the access request issued from the next-previous access module.

4. The apparatus according to claim 2, further comprising a counter unit configured to count a number of consecutive accesses made by the next-previous access module and, wherein the first arbiter is configured to suppress the access request from the next-previous access module if the number of consecutive accesses exceeds a predetermined number.

5. The apparatus according to claim 2, further comprising a request queue configured to stack at least one request transmitted from each of the plurality of access modules, and wherein the first arbiter detects a number of the request stacked on the request queue for each of the plurality of modules, and the first arbiter controls the priority according to the number of requests from each of the plurality of access modules.

6. The apparatus according to claim 5, wherein the first arbiter gives priority to the access made by an access module which has more requests than other modules.

7. The apparatus according to claim 2, wherein the first arbiter gives priority to a module that generates the request with a low frequency.

8. The apparatus according to claim 2, wherein the first arbiter gives priority to a module that transmits the request with short latency.

9. A method for controlling an arbiter configured to arbitrate access requests for a memory by a plurality of modules, the method comprising:
   selecting and issuing one of the access requests in a request queue which may store a write request or a read request received from the plurality of modules, selectively;
   estimating data amount to be accumulated in a write buffer if write requests in the request queue are executed and amount of free space to be obtained in a read buffer if read requests in the request queue are executed;
   storing in a register a type of access request representing whether a next-previous access request issued from the issuance unit is a read request or a write request; and
   determining a type of each of the received access requests with the type of the next-previous access request stored in the register, wherein in issuing the request, a write request is preferentially selected if the estimated data amount to be accumulated in the write buffer is greater than a first threshold and the next-previous access request is a write request, and selects a read request if the estimated data amount is not greater than the first threshold and the estimated amount of free space to be obtained in the read buffer is greater than a second threshold and the next-previous access request is a read request.

10. A computer-readable storage medium storing a program for controlling a computer to execute a method according to claim 9.

* * * * *